(12) United States Patent
Staal et al.

(10) Patent No.: US 12,172,397 B2
(45) Date of Patent: Dec. 24, 2024

(54) STRUCTURES AND METHODS FOR REPAIRING COMPOSITE MEMBERS

(71) Applicant: The Boeing Company, Chicago, IL (US)

(72) Inventors: Remmelt Andrew Staal, Huntington Beach, CA (US); Justin H. Register, Charleston, SC (US); Michael J. Caprini, Fountain Valley, CA (US)

(73) Assignee: The Boeing Company, Arlington, VA (US)

( * ) Notice: Subject to any disclaimer, the term of this patent is extended or adjusted under 35 U.S.C. 154(b) by 56 days.

(21) Appl. No.: 17/665,751

(22) Filed: Feb. 7, 2022

(65) Prior Publication Data
US 2022/0281188 A1  Sep. 8, 2022

Related U.S. Application Data

(60) Provisional application No. 63/156,991, filed on Mar. 5, 2021.

(51) Int. Cl.
*B29C 73/10* (2006.01)
*B64C 1/06* (2006.01)

(52) U.S. Cl.
CPC .............. *B29C 73/10* (2013.01); *B64C 1/064* (2013.01)

(58) Field of Classification Search
CPC ......... B29C 73/10; B29C 73/00; B64C 1/064; B64C 2001/0072; B64F 5/40
See application file for complete search history.

(56) References Cited

U.S. PATENT DOCUMENTS

| | | | |
|---|---|---|---|
| 2013/0089697 | A1 | 4/2013 | Griess et al. |
| 2015/0041044 | A1* | 2/2015 | Griess ............... B32B 37/18 |
| | | | 156/60 |
| 2017/0100911 | A1 | 4/2017 | Kwon et al. |

(Continued)

FOREIGN PATENT DOCUMENTS

| | | |
|---|---|---|
| EP | 3 498 462 | 6/2019 |
| EP | 3 647 033 | 5/2020 |
| WO | WO 2013/022534 | 2/2013 |

OTHER PUBLICATIONS

European Patent Office, Extended European Search Report, App. No. 22155609.5 (Jul. 8, 2022).

(Continued)

*Primary Examiner* — S. Behrooz Ghorishi
(74) *Attorney, Agent, or Firm* — Walters & Wasylyna LLC

(57) ABSTRACT

A method for repairing a composite member includes assembling a composite stack on a surface. The composite stack includes a first book nested with a second book. An adhesive is disposed between the first book and the second book. At least one of the first book and the second book includes a first pattern of slots. The method further includes setting the composite stack to yield a composite repair piece. The method further includes attaching the composite repair piece to the composite member. Also disclosed is a composite repair piece. The composite repair piece includes a first book and a second book. The second book is stacked on top of the first book. An adhesive is disposed between the first book and the second book. At least one of the first book and the second book includes a first pattern of slots.

20 Claims, 7 Drawing Sheets

(56) References Cited

U.S. PATENT DOCUMENTS

2019/0099959 A1    4/2019   Staal et al.
2019/0177007 A1*   6/2019   Griess .................... B29C 73/04
2020/0398504 A1   12/2020   Register et al.

OTHER PUBLICATIONS

Canadian Intellectual Property Office, Office Action, App. No. 3,147,928 (Feb. 15, 2024).

* cited by examiner

STRUCTURES AND METHODS FOR REPAIRING COMPOSITE MEMBERS

PRIORITY

This application claims priority from U.S. Ser. No. 63/156,991 filed on Mar. 5, 2021.

FIELD

The present disclosure generally relates to composite structures and, more specifically, to methods and structures used to repair damaged composite members having curved geometries.

BACKGROUND

Fiber-reinforced plastics, such as epoxy-based carbon fiber-reinforced plastic (CFRP) composites, have high strength-to-weight ratios and excellent durability, among other desirable properties. Therefore, composite structures formed from fiber-reinforced plastics are now widely used in the aerospace industry (e.g., as structural components of aircraft), as well in various other industries.

While fiber-reinforced plastics have many advantages, the repair of composite structures formed from fiber-reinforced plastics can be time-consuming and, therefore, expensive. One of the largest drawbacks with carbon fiber-reinforced plastic material is that once the material is cured in a certain size or shape, the part is geometrically locked to that size and shape. Therefore, challenges arise when a part comprised of carbon fiber-reinforced plastic material is damaged and requires repair, particularly when the part has a curved or complex geometry.

Existing processes for repairing a damaged carbon fiber-reinforced plastic part include creating a tooling surface and curing an overlay part to match the part geometry. These processes can be time consuming and result in added delay to getting the part back in service. Specific challenges arise in the repair of a damaged curved part, such as a hat section on an airplane member, that requires mimicking the geometry and stiffness of the original aircraft member. Other factors include the ability to cure the part in an autoclave using pre-impregnated materials.

Accordingly, those skilled in the art continue with research and development efforts in the field of repairing damaged composite members having curved geometries.

SUMMARY

Disclosed methods for repairing composite members.

In one example, the disclosed method for repairing composite members includes assembling a composite stack on a surface. The composite stack includes a first book nested with a second book. An adhesive is disposed between the first book and the second book. At least one of the first book and the second book includes a first pattern of slots. The method further includes setting the composite stack to yield a composite repair piece. The method further includes attaching the composite repair piece to the composite member.

Also disclosed are composite repair pieces and repaired composite structure that include composite repair pieces.

In one example, the disclosed composite repair piece includes a first book and a second book. The second book is stacked on top of the first book. An adhesive is disposed between the first book and the second book. At least one of the first book and the second book includes a first pattern of slots.

Other examples of the disclosed methods for repairing composite members and the disclosed composite repair pieces will become apparent from the following detailed description, the accompanying drawings, and the appended claims

BRIEF DESCRIPTION OF THE DRAWINGS

FIG. 4 is a side cross-sectional view of the assembly of a repair piece over a surface with a release film disposed between;

DETAILED DESCRIPTION

Disclosed are methods and structures for repairing composite members.

In one example, the repair structures include a plurality of books having two plies of composite material. Each book has a plurality of slots to add flexibility and conformability to the repair structure. By stacking the slotted books in a predefined form with slots placed at strategic locations, followed by curing an adhesive disposed between the books under vacuum pressure, it is possible to create a repair piece having comparable material and mechanical properties to an autoclaved repair piece. The repair piece helps to restore the structural integrity of the damaged portion of the composite member.

The disclosed methods for repairing composite members are useful in the repair of airplane members, such as stringers and hat sections, as well a number of applications including those having twisted angles or other complex geometries used for stiffening composite parts.

Figure 1:
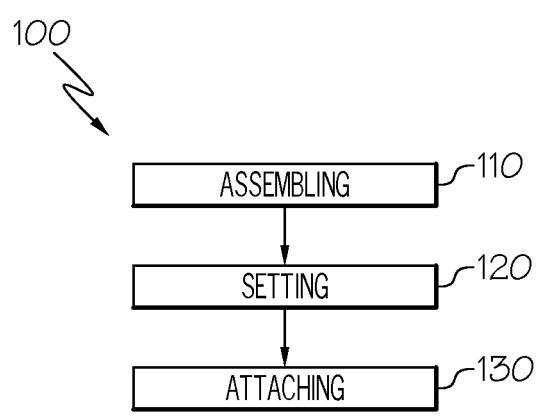
FIG. 1 is a flowchart depicting one example of the disclosed method for repairing a composite member.

Referring to FIG. 1, a method 100 for repairing a composite member 200 is disclosed. In one or more examples, the method 100 includes assembling 110 a composite stack 205, FIG. 2, on a surface 300, FIG. 3. In one example, the method 100 includes positioning a release film 255 over the surface 300 prior to the assembling 110, as shown in FIG. 4. In one example, the surface 300 is defined by a tool 310 having a surface geometry that is substantially the same as a surface geometry of a damaged portion of the composite member 200. In another example, the surface 300 is a portion of the composite member 200 such that the composite stack 205 is assembled directly on or within close proximity to the damaged portion of the composite member 200 such that the geometry is substantially the same as the geometry of the damaged portion of the composite member 200.

In one example, the composite member 200 includes a stringer portion of an airplane. In another example, the composite member 200 includes a hat portion of an airplane. In another example, the composite member 200 includes a skin panel of an airplane. In yet another example, the composite member 200 includes non-uniform and or curved geometries.

Figure 5:
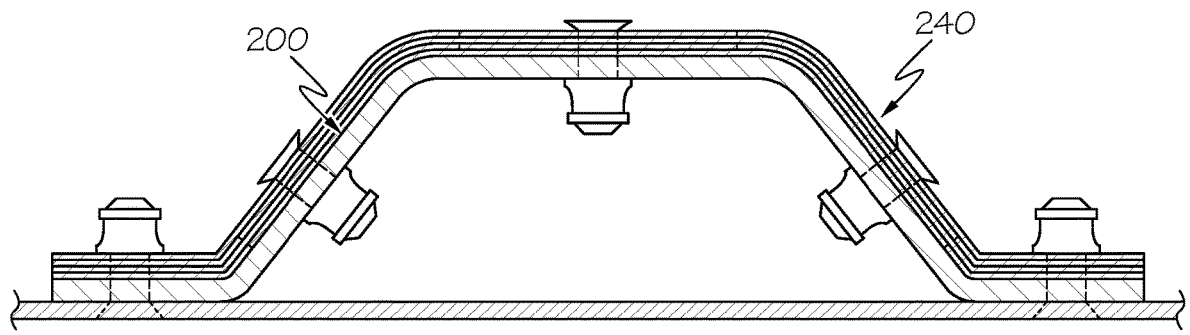
FIG. 5 is a side cross-sectional view of a repair piece bolted to a composite member to yield a repaired composite structure.
Figure 6:
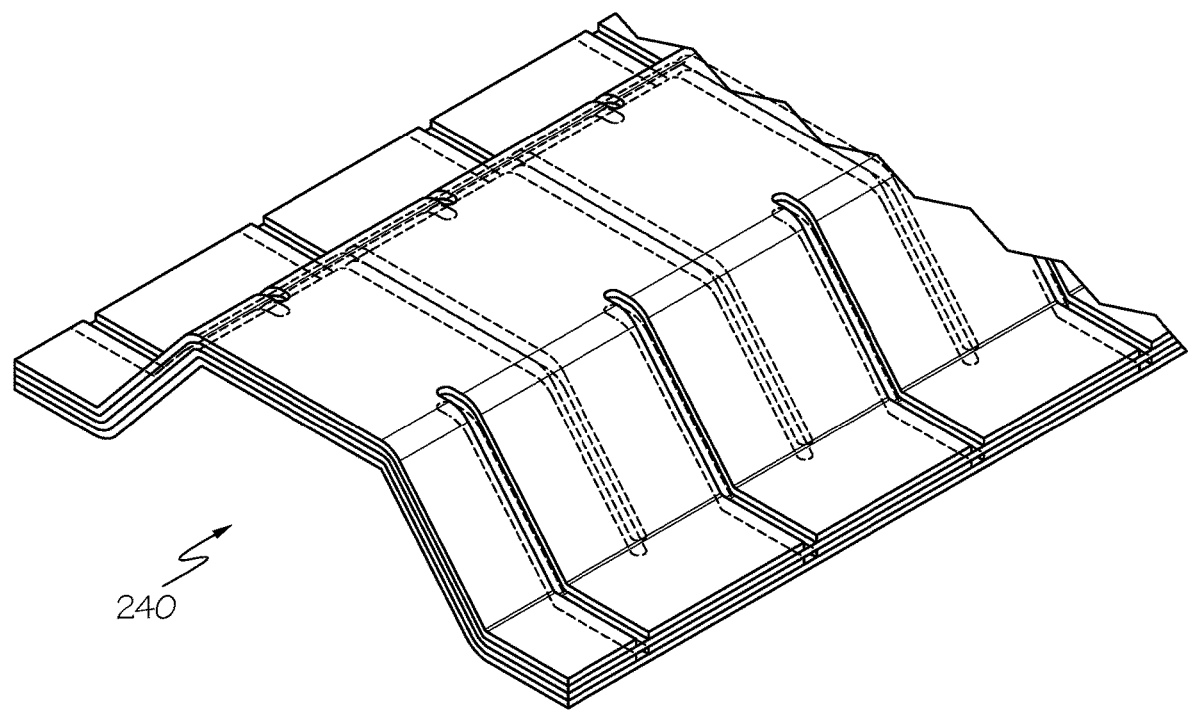
FIG. 6 is an isometric view of a repair piece used in the method of FIG. 1.
Figure 7:
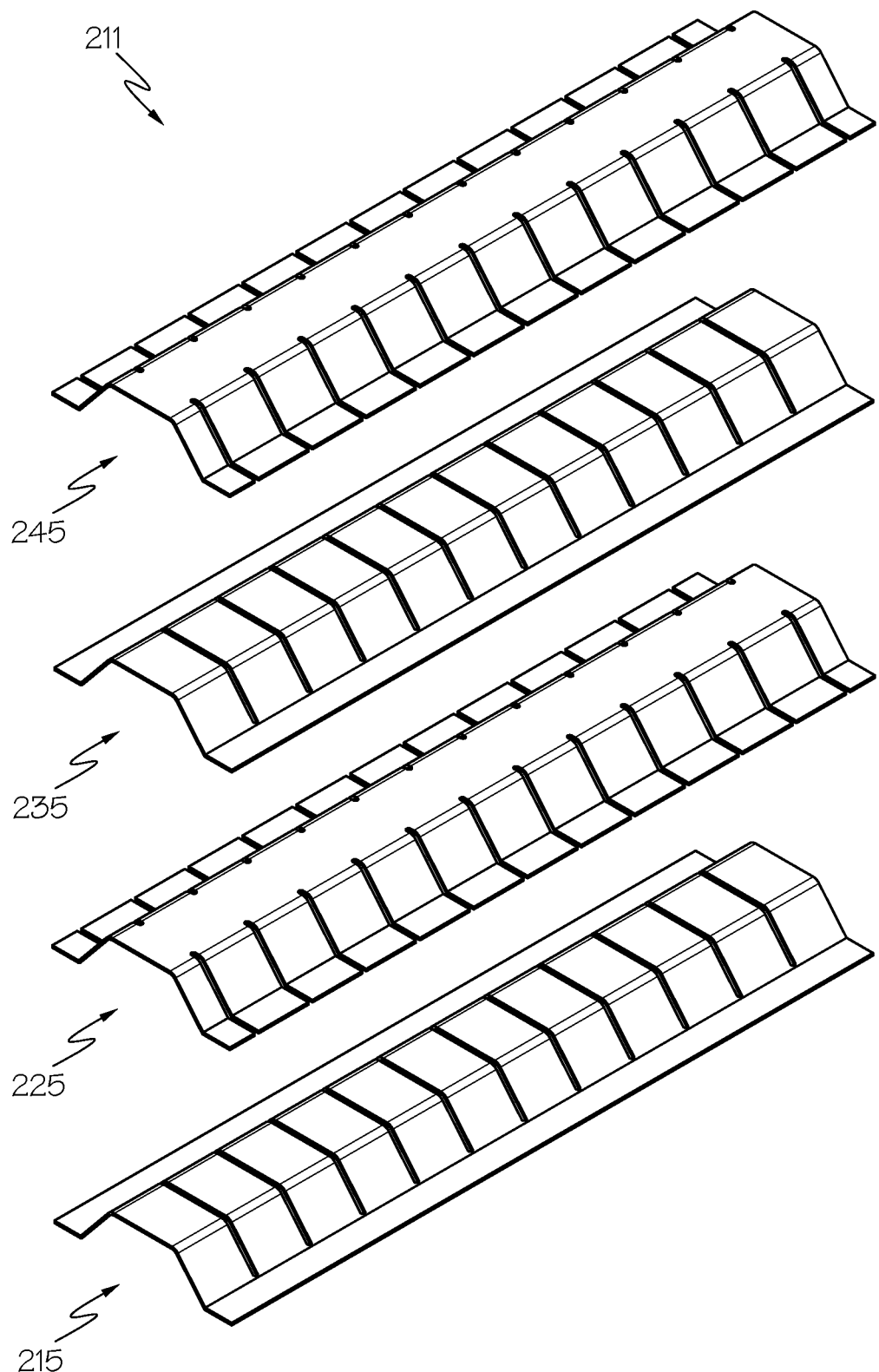
FIG. 7 is an exploded isometric view of the repair piece of FIG. 6.

Referring to FIGS. 2-7, the composite stack 205 includes a plurality of books 211, as shown in FIG. 7. In one example, the plurality of books 211 are precured. In one example, the plurality of books 211 includes at least a first book 215 and a second book 225. The first book 215 and the second book 225 are configured to nest together such that they have substantially the same geometry.

In one or more examples, an adhesive 210 is disposed between the first book 215 and the second book 225. In one example, the adhesive 210 is a film adhesive. Various adhesive 210 compositions may be used to assemble the composite stack 205 without departing from the scope of the present disclosure. In one particular implementation, the adhesive 210 may be (or may include) a thermosetting adhesive, such as an epoxy adhesive. In another example, the adhesive 210 may come in the form of a film (a film adhesive), or though other forms, such as liquid, powder or the like, may be used without departing from the scope of the present disclosure. In yet another example, a release film 255 is disposed between the first book 215 and the second book 225.

Figure 2:
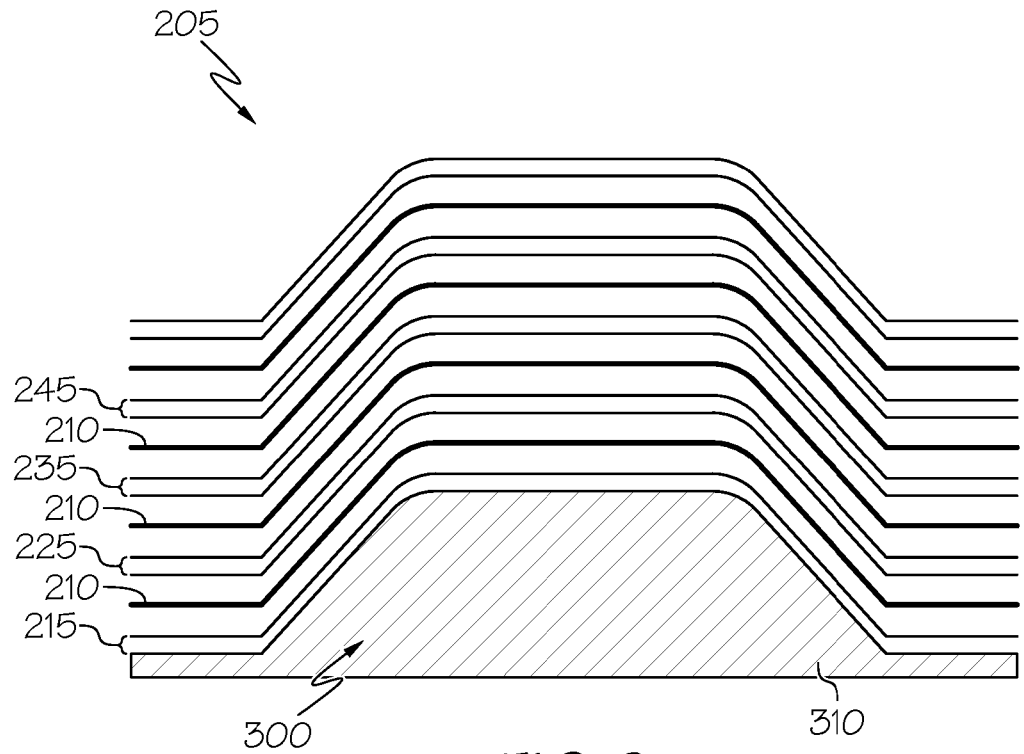
FIG. 2 is a side cross-sectional exploded view of the assembly of a repair piece used in the method of FIG. 1.
Figure 3:
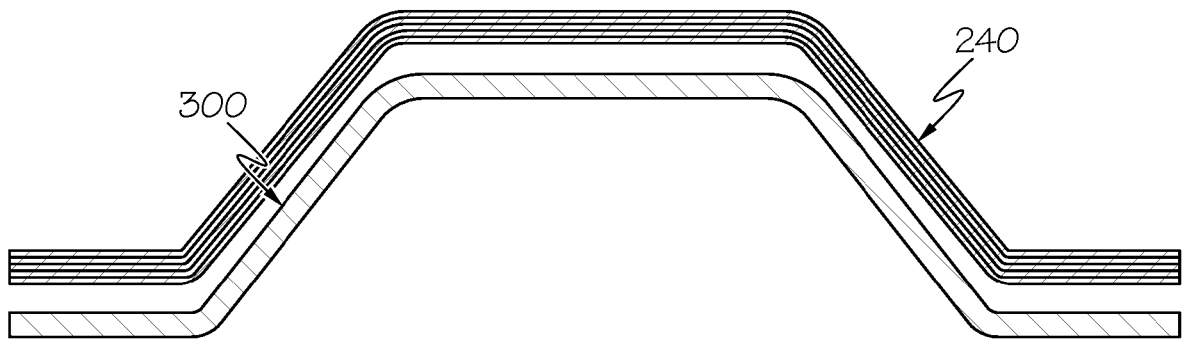
FIG. 3 is a side cross-sectional view of the assembly of a repair piece over a surface.
Figure 4:
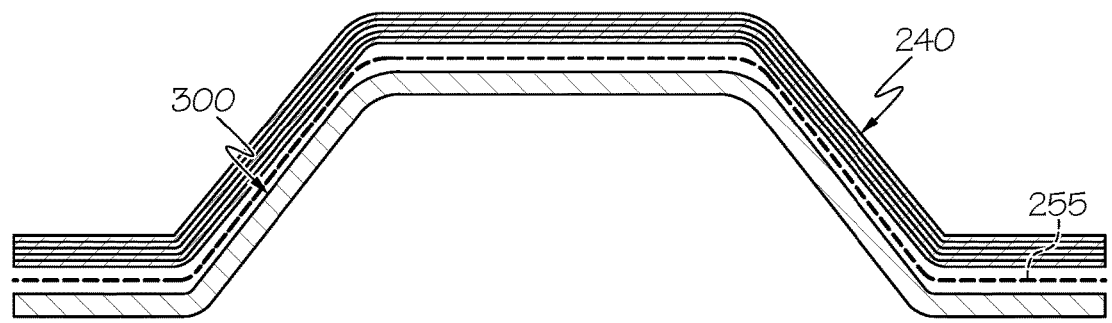

Referring to FIGS. 2-7, in one or more examples, the plurality of books 211 includes a first book 215, a second book 225, and a third book 235. In another example, the plurality of books 211 further includes a fourth book 245. The first book 215, second book 225, third book 235, and fourth book 245 have substantially the same geometry such that that are configured to nest together. FIG. 2 illustrates an exploded view of the assembly of the first book 215, second book 225, third book 235, and fourth book 245. In one example, as illustrated in FIG. 2, an adhesive 210 is disposed between the first book 215 and the second book 225, between the second book 225 and the third book 235, and between the third book 235 and the fourth book 245.

Referring to FIG. 6 and FIG. 7, in one example, at least one of the first book 215 and the second book 225 includes a first pattern of slots. In another example, both the first book 215 and the second book 225 include a first pattern of slots and a second pattern of slots, respectively. In one example, the first pattern of slots and the second pattern of slots are offset from each other such that none of the slots from the first pattern of slots intersect with the slots of the second pattern of slots. In another example, a portion of the first pattern of slots and the second pattern of slots overlap and other portions are offset.

Referring to FIG. 6 and FIG. 7, in one example, at least one of the first pattern of slots and the second patter of slots is elongated. In another example, the first pattern of slots and the second pattern of slots are parallel to each other and offset such that they do not intersect. In another example, the first pattern of slots and the second pattern of slots are parallel to each other and at least one slot of each pattern of slots is offset such that some slots may intersect each other but not all.

Referring to FIG. 6 and FIG. 7, in one example, the slots of the first pattern of slots and second pattern of slots are equidistantly spaced. In another example, the slots of the first pattern of slots and second pattern of slots are randomly spaced such that some may be equidistantly spaced from each other and some may not be equidistantly spaced from each other. In one example, the slots of the first pattern of slots are equidistantly spaced from each other. In another example, the slots of the first pattern of slots are not equidistantly spaced from each other.

Referring to FIG. 6 and FIG. 7, in one example, at least one slot of the first pattern of slots and the second pattern of slots terminates at a free edge of the composite stack 205. In another example, every slot of the first pattern of slots terminates before reaching the free edges of the composite stack 205. In another example, the slots of the first pattern of slots are offset from each other at distances ranging from 0.1 inches to 2 inches.

Referring to FIG. 6 and FIG. 7, in one example where the composite member 200 is a stringer, at least one of the first pattern of slots and the second pattern of slots is entirely on the web portion of the stringer, while the other pattern of slots extends from the web portion to the flange portion of the stringer.

Referring to FIG. 6 and FIG. 7, in one example, the first book 215 and the third book 235 include a first pattern of slots. In one example, the second book 225 and the fourth book 245 include a second pattern of slots. In one example, the first pattern of slots is offset from the second pattern of slots such that the slots of the first book 215 and the third book 235 are substantially aligned and the slots of the second book 225 and fourth book 245 are substantially aligned and offset from the slots of the first book 215 and the third book 235.

Referring to FIG. 6 and FIG. 7, in one example, the third book 235 includes a third pattern of slots and the fourth book 245 includes a fourth pattern of slots. In one example, the third pattern of slots and the first pattern of slots overlap. In another example, third pattern of slots and the first pattern of slots are substantially the same. In another example, the second pattern of slots and the fourth pattern of slots overlap. In another example, the second pattern of slots and the fourth pattern of slots are substantially the same.

Referring to FIG. 1, in one or more examples, the method 100 includes setting 120 the composite stack 205 to yield a composite repair piece 240. In one example, setting 120 includes curing the adhesive of the composite stack 205 at a temperature between 225° F. and 275° F., preferably between 240° F. and 260° F., and even more preferably at approximately 250° F. In one example, the setting 120 occurs for approximately 60 minutes to approximately 120 minutes, preferably between approximately 75 minutes and approximately 105, and more preferably for approximately 90 minutes. In one example, the setting 120 occurs on a tool 310. In another example, the setting 120 occurs on the composite member 200. Once the composite stack 205 is set, the composite stack 205 becomes a repair piece 240 that is configured to fit over a portion of composite member 200.

Referring to FIG. 1, in one example, the setting 120 includes applying pressure to the composite stack 205 to yield a composite repair piece 240. In another example, the setting 120 includes vacuum sealing the composite stack 205 with a vacuum bag to yield a composite repair piece 240.

Referring to FIG. 1, in one or more examples, the method 100 includes attaching 130 the composite repair piece 240 to the composite member 200 to yield a repaired composite structure, as shown in FIG. 5. In one example, the attaching 130 the composite repair piece 240 to the composite member 200 includes fastening the composite repair piece 240 directly to the composite member 200. In one example, the attaching 130 includes using a mechanical fastener, such as a bolt, a nut-and-bolt, a rivet, a pin, a screw, a nail, or the like.

In one example, the method 100 includes positioning a release film 255 over the composite member 200 prior to the attaching 130 such that a release film 255 is disposed between the composite repair piece 240 and the composite member 200. In one example, the attaching 130 the composite repair piece 240 to the composite member 200 includes bolting the composite repair piece 240 to the composite member 200, as shown in FIG. 5. In another example, the attaching 130 the composite repair piece 240 to the composite member 200 includes bonding with an adhesive.

In one or more examples, each book of the plurality of books 211 includes at least one ply of fiber-reinforced plastic. In another example, at least one book of the plurality of books 211 includes at least two plies of fiber-reinforced plastic. In another example, at least one book of the plurality of books 211 includes at least three plies of fiber-reinforced plastic. In yet another example, at least one book of the plurality of books 211 includes at least four or more plies of fiber-reinforced plastic.

In one example, the plies of fiber-reinforced plastic in the plurality of books 211 are precured. The plies of fiber-reinforced plastic may be oriented in various ways with respect to other plies of fiber-reinforced plastic in each book without departing from the scope of the present disclosure. In one example, the matrix material of the fiber-reinforced plastic may be (or may include) a thermoset resin, such as, for example, an epoxy resin or the like, and combinations of thermoset resins. It is also contemplated that the matrix material of the fiber-reinforced plastic may be (or may include) a thermoplastic resin, such as, for example, polyetheretherketone ("PEEK"), polyetherketoneketone ("PEKK"), polyphenylsulfone ("PPS"), polyetherimide ("PEI") or the like, and combinations of thermoplastic resins.

Figure 8:
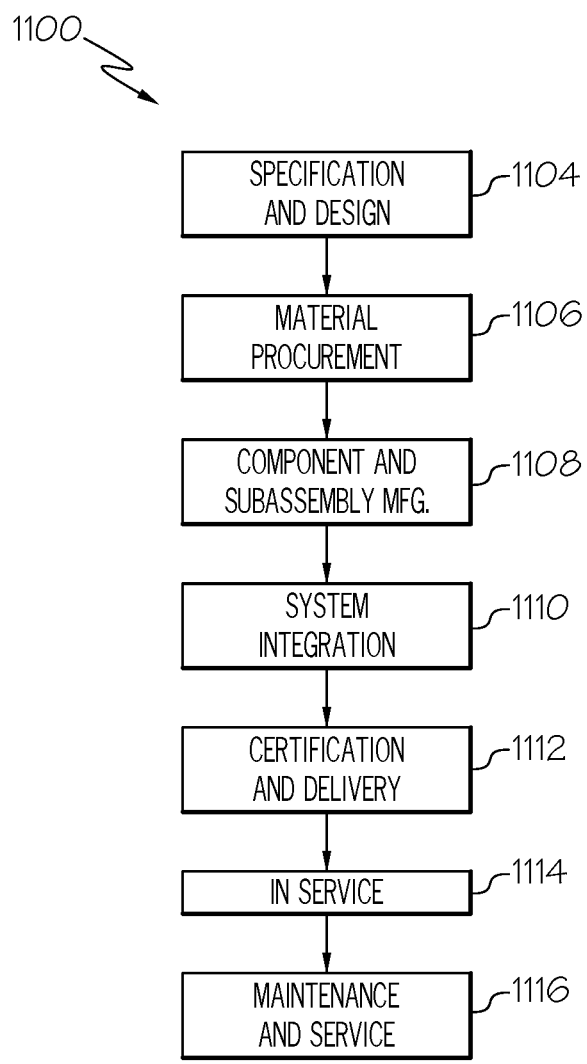
FIG. 8 is a block diagram of aircraft production and service methodology.
Figure 9:
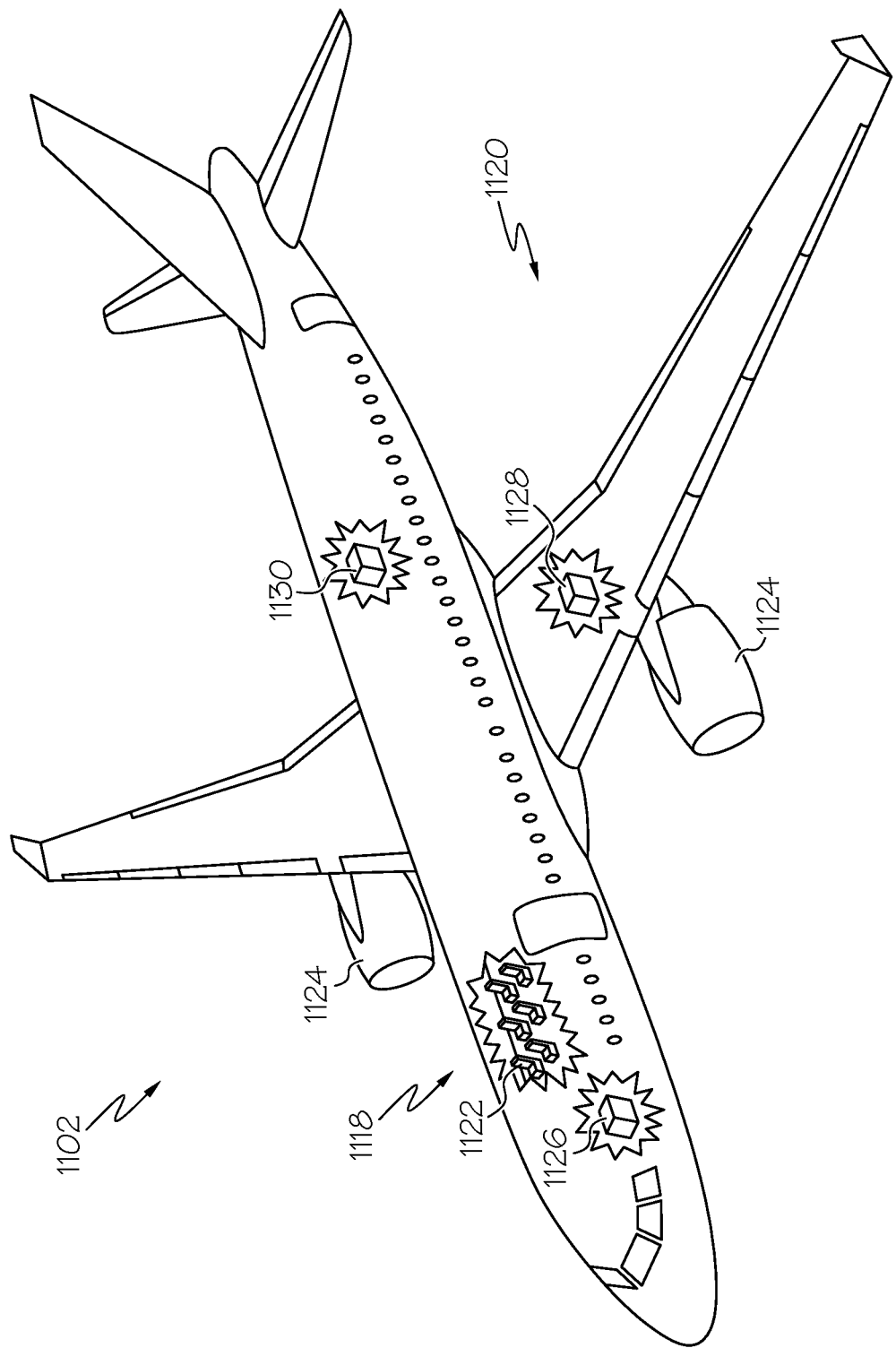
FIG. 9 is a schematic illustration of an aircraft.

Examples of the subject matter disclosed herein may be described in the context of aircraft manufacturing and service method 1100 as shown in FIG. 8 and aircraft 1102 as shown in FIG. 9. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 9, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus (es), method(s), or combination thereof may be utilized during production stages (block 1108 and block 1110), for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s), disclosed herein, may include any of the components, features, and functionalities of any of the other examples of the apparatus (es) and method(s) disclosed herein in any combination.

Modifications of examples set forth herein will come to mind of those skilled in the art, having the benefit of the teachings, presented in the foregoing descriptions and the associated drawings.

What is claimed is:

1. A method for repairing a composite member, the method comprising:
   assembling a composite stack on a surface, the composite stack comprising:
   a first book nested with a second book; and
   an adhesive disposed between the first book and the second book,
   wherein the first book comprises a first pattern of elongated slots and the second book comprises a second pattern of elongated slots different from the first pattern of elongated slots, and
   wherein the first pattern of elongated slots terminate before reaching a free edge of the composite stack and the second pattern of elongated slots terminate at a free edge of the composite stack;
   setting the composite stack to yield a composite repair piece; and
   attaching the composite repair piece to the composite member.

2. The method of claim 1, wherein the first pattern of elongated slots is offset from the second pattern of elongated slots.

3. The method of claim 1, wherein:
   the composite stack further comprises a third book stacked on top of the second book, and
   the adhesive is disposed between the second book and the third book.

4. The method of claim 3, wherein the first book and the third book comprise the first pattern of elongated slots, wherein the second book comprises the second pattern of elongated slots, and wherein the first pattern of elongated slots is offset from the second pattern of elongated slots.

5. The method of claim 1, wherein:
   the composite stack further comprises a third book stacked on top of the second book, the adhesive is disposed between the second book and the third book, the composite stack further comprises a fourth book stacked on top of the third book, and the adhesive is disposed between the third book and the fourth book.

6. The method of claim 5, wherein the first book and the third book comprise the first pattern of elongated slots, wherein the second book and the fourth book comprise the second pattern of elongated slots, and wherein the first pattern of elongated slots is offset from the second pattern of elongated slots.

7. The method of claim 1, wherein the first book comprises at least one ply of fiber-reinforced plastic.

8. The method of claim 1, wherein the first book comprises at least two plies of fiber-reinforced plastic.

9. The method of claim 1, wherein the surface is defined by a tool having a surface geometry that is substantially the same as a surface geometry of a damaged portion of the composite member.

10. The method of claim 1, wherein the setting comprises curing the adhesive.

11. The method of claim 1, wherein the attaching comprises joining with a mechanical fastener.

12. The method of claim 1, wherein the attaching comprises bonding with an adhesive.

13. The method of claim 1 comprising:

positioning a release film over the surface prior to the assembling.

14. A method for repairing a composite member, the method comprising:

assembling a composite stack on a surface of the composite member, the composite stack comprising:

a first book nested with a second book; and an adhesive disposed between the first book and the second book, wherein at least one of the first book and the second book comprises a first pattern of elongated slots that terminate before reaching a free edge of the composite stack; and setting the composite stack to yield a composite repair piece on the surface of the composite member.

15. The method of claim 14, wherein the first pattern of elongated slots are parallel to each other.

16. The method of claim 14, wherein the first pattern of elongated slots are equidistantly spaced.

17. The method of claim 14, wherein the second book comprises a second pattern of elongated slots that terminate at a free edge of the composite stack.

18. The method of claim 17, wherein the first pattern of elongated slots is offset from the second pattern of elongated slots.

19. The method of claim 14, wherein the first book comprises the first pattern of elongated slots and the second book comprises a second pattern of elongated slots that terminate at a free edge of the composite stack.

20. A composite repair piece comprising:

a first book;

a second book stacked on top of the first book; and an adhesive disposed between the first book and the second book to form a composite stack with the first book and the second book, wherein at least one of the first book and the second book comprises a first pattern of elongated slots that terminate before reaching a free edge of the composite stack.

* * * * *